United States Patent Office 3,525,771
Patented Aug. 25, 1970

3,525,771
3-(3-HYDROXY-3-PHENYL-BUTYLAMINO) PROPIOPHENONES
Nicholas Malatestinic, Brooklyn, N.Y., and Albert Ziering, Nutley, N.J., assignors to Hoffmann-La Roche Inc., Nutley, N.J., a corporation of New Jersey
No Drawing. Original application Sept. 9, 1964, Ser. No. 395,329, now Patent No. 3,337,546, dated Aug. 22, 1967. Divided and this application June 23, 1967, Ser. No. 648,208
Int. Cl. A61k 27/00; C07c 95/00
U.S. Cl. 260—570.5                              3 Claims

ABSTRACT OF THE DISCLOSURE

3 - (3-hydroxy 3-phenyl butylamino) propiophenone and analogs thereof are prepared by acid hydrolysis of the corresponding 3 - (3,4,5,6-tetrahydro-2H-1,3-oxazin-3-yl) propiophenones. The novel propiophenone derivatives have hypotensive properties.

RELATED APPLICATIONS

The present application is a division of copending application Ser. No. 395,329, filed Sept. 9, 1964 now U.S. Pat. No. 3,337,546.

DETAILED DESCRIPTION OF THE INVENTION

The present invention relates to certain novel propiophenone compounds and derivatives thereof and to methods for preparing the same. More particularly, the invention concerns 3-(3,4,5,6-tetrahydro-2H-1,3-oxazin-3-yl) propiophenones, their acid hydrolysis products and the corresponding carbinol derivatives in each case.

Thus, in one aspect, the present invention concerns the substituted propiophenones and the corresponding alcohols which can be represented by the general formula

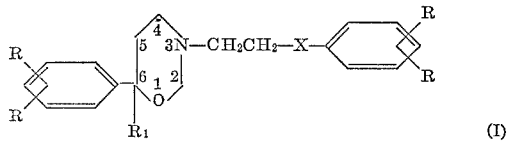

(I)

wherein the symbols R represent hydrogen, halogen, lower alkyl, lower alkoxy, hydroxy, nitro or acetamido; $R_1$ represents hydrogen or lower alkyl; and X represents the carbonyl group

or a carbinol group

in which the symbol $R_2$ represents hydrogen or lower alkyl and acid addition salts thereof with pharmaceutically acceptable acids.

Compounds represented by structural Formula I above wherein X is a carbonyl group

and $R_1$ is hydrogen or methyl constitute a preferred group.

In another aspect, the present invention concerns the acid hydrolysis products of the propiophenones of Formula I and the derivatives thereof which can be represented by the general formula

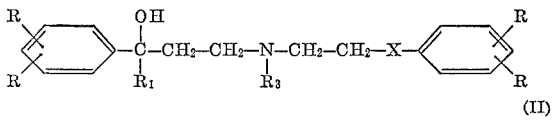

(II)

wherein the symbols R, $R_1$ and X have the same meaning as above and $R_3$ represents hydrogen or lower alkyl and acid addition salts thereof with pharmaceutically acceptable acids.

In the formulae above, either one or all of the symbols R may represent hydrogen or one of the enumerated substituent groups so that either an unsubstituted phenyl group or a phenyl radical bearing one or more substituent groups may be present at the terminal ends of the structure. All four halogens, i.e. chlorine, bromine, fluorine and iodine are included within the meaning of the symbol R. The lower alkyl groups comprehended by this disclosure are those having 1 to 7 carbon atoms such as methyl, ethyl, propyl, isopropyl, butyl, isobutyl, amyl, isoamyl and the like. The lower alkoxy groups include ether groups containing the same lower alkyl radicals as above.

The novel compounds of this invention and their pharmaceutically acceptable acid addition salts, i.e., the compounds of Formula I and the compounds of Formula II and acid salts thereof, have useful pharmacological properties. Particularly, they are useful as hypotensive agents, for example, the compounds of Formula I have demonstrated potent hypotensive properties following both intravenous and oral administration to test animals. More particularly, they are useful in improving circulation by peripheral vasodilation. Hence, they are useful in the treatment of hypertension. The compounds of Formula II have also shown potent hypotensive properties in test animals, particularly following intravenous administration.

The compounds of the invention can be administered orally or intravenously with dosage adjusted to individual requirements. They can be administered in conventional pharmaceutical forms, for example, they can be administered in admixture with conventional organic or inorganic pharmaceutical carriers suitable for oral or intravenous administration such as gelatin, starch, magnesium stearate, talc, vegetable oils, gums, polyethylene glycols, Vaselines and the like. The pharmaceutical preparations can be in conventional solid forms such as tablets, dragees, suppositories, capsules, and the like or in conventional liquid forms such as suspensions, emulsions and the like. They can be submitted to conventional pharmaceutical expedients, for example, sterilization, and they can contain pharmaceutical adjuvants such as preservatives, sterilizing agents, wetting agents, emulsifying agents, etc. The pharmaceutical preparations can also contain other therapeutically valuable substances.

The ketones of structural Formula I above are derived from acetophenones or substituted acetophenones which can be represented by the formula

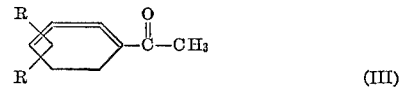

(III)

wherein the symbol R has the same significance as in Formulae I and II above by reacting an acetophenone of Formula III with formaldehyde and a substituted oxazine of the general formula

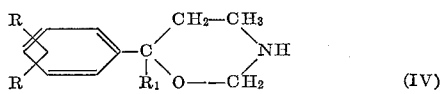

in which the symbols R and $R_1$ have the same meaning as the corresponding symbols in structural Formulae I and II above.

The resulting ketones can then be reduced to the corresponding alcohols. Alternatively, the ketones can be hydrolyzed to the open chain compounds of Formula II which can in turn be reduced to the corresponding dihydroxy compounds. The oxazine compounds of Formula IV used as starting materials in the practice of this invention are known compounds made by known processes.

The first step of the procedure for forming the products of this invention involves reacting paraformaldehyde and an acetophenone or the appropriately substituted acetophenone with an appropriately substituted oxazine compound of Formula IV, preferably in the form of its hydrochloride salt. The reaction is suitably carried out by initially converting the oxazine compound to its hydrochloride salt. This can be easily done by treating the oxazine compound with hydrogen chloride in an inert organic solvent such as ethyl acetate. Preferably, the hydrogen chloride is employed in excess of the amounts theoretically indicated. The reaction of the oxazine salt with the acetophenone is readily carried out by simply mixing acetophenone and paraformaldehyde with the oxazine salt in a suitable inert organic solvent. As solvents one can use, for example, hydrocarbon esters such as ethyl acetate, ethyl propionate and the like. The reaction can be carried out over a wide range of temperatures. A convenient temperature is the boiling point of the reaction mixture though lower temperatures can be utilized. The reaction is completed when all of the oxazine salt has dissolved. Upon completion of the reaction, the solution is filtered and concentrated until the product crystallizes out. Generally, a well-crystallized material results which can be easily separated. The product can, if desired, be further purified by recrystallizing from a suitable organic solvent such as acetonitrile or ethyl acetate containing hydrogen chloride gas. The temperature of the reaction is not particularly critical and for the most part can be varied within wide limits. However, it has been found convenient to operate at an elevated temperature. An especially suitable temperature is the boiling point of the reaction mixture.

In a next step in the procedure of this invention, the substituted propiophenones of Formula I can be converted to the corresponding open chain compounds of Formula II by hydrolysis. The hydrolysis can be conveniently carried out by contacting the substituted propiophenone compound of Formula I with a molar quantity of water in the presence of an anhydrous organic solvent. Among the various solvents suitable for the purpose may be mentioned the low-boiling alcohols such as isobutyl alcohol. While the hydrolysis can be carried out with equimolar amounts of reactants, it is preferable to employ a slight excess of water in order to insure maximum conversion of the substituted propiophenone. The temperature of the hydrolysis is not critical and the reaction can be carried out even at room temperature. It has been found convenient, however, to carry out the hydrolysis at the reflux temperature of the reaction mixture. The products are recovered by cooling the hydrolysis mixture in ice-water and filtering off the product. The product can be further purified, if necessary, by recrystallizing from acetonitrile or ethyl acetate.

The propiophenone of Formula I can, if desired, be converted to the corresponding quaternary ammonium salts by the usual method of forming quaternary ammonium salts from tertiary amines. Thus, the propiophenones of Formula I can be reacted with an alkyl halide, preferably a lower alkyl halide, to obtain the corresponding quaternary ammonium salt which can in turn be hydrolyzed in the same manner as above to form the N-alkylated carbinols of Formula II.

The substituted propiophenones of Formula I and Formula II can be hydrogenated to produce the corresponding secondary alcohols, for example, by treating with alkali metal hydrides such as potassium borohydride, preferably in an inert organic solvent such as alcohol. Other techniques commonly used for reducing carbonyl compounds such as catalytic reduction with Raney nickel in the presence of alkali could also be utilized to convert the carbonyl compounds to the corresponding carbinols. The substituted propiophenones of Formula I and Formula II can also be converted to the tertiary carbinols of this invention by Grignard reaction of the carbonyl radical with lower alkyl magnesium halides. The Grignard reaction can be carried out in the usual way by adding the carbonyl compound to the Grignard reagent in ether with stirring. The mixture is then treated with ammonium chloride and the product is recovered by distillation.

As indicated above, the products of the invention occur in both the free base and the acid salt form. The products, as represented by Formula I and Formula II are in their free base form. In some instances, it will be desirable to obtain the acid salt from the free base. In this case, the salt can be prepared by reacting the free base with the corresponding acid in the presence of a suitable organic solvent in which the intended salt is insoluble, thereby permitting isolation of the salt by filtration, decantation or other suitable means. In this way, it is possible to obtain such acid addition salts as the hydrohalides, e.g., hydrochloride, hydrobromide, other mineral acid salts such as sulfate, nitrate, phosphate and the like as well as organic acid salts such as acetate, tartrate maleate, citrate, salicylate, ascorbate, etc. On the other hand, in those instances where it is desired to convert the acid salt to the free base, the same can be accomplished by dissolving or suspending the salt in a suitable solvent such as water, methanol, etc., and neutralizing the solution with a basic material such as a dilute solution of sodium carbonate, sodium hydroxide, ammonium hydroxide and the like and isolating the desired base by extraction with ether or other similar means. Pharmaceutically acceptable acid addition salts are prepared from pharmaceutically acceptable acids.

Within the class of compounds represented by Formula I and Formula II above those wherein X represents the carbonyl radical constitute a preferred group. Especially preferred compounds of this group are the compound of Formula I wherein R is hydrogen and $R_1$ is methyl, namely, 3-(3,4,5,6-tetrahydro-6-methyl-6-phenyl-2H - 1,3 - oxazin-3-yl)propiophenone and the compound of Formula II wherein R is hydrogen, $R_1$ is methyl and $R_3$ is hydrogen, namely, 3-(3-hydroxy-3-phenylbutylamino)propiophenone.

The examples below illustrate, in detail, some of the compounds which comprise this invention and methods for their synthesis. However, the invention is not to be construed as limited by the examples. All temperatures are in degrees centigrade and all melting points are corrected.

Example 1.—3-(3,4,5,6-tetrahydro-6-methyl-6-phenyl-2H-1,3-oxazin-3-yl)propiophenone hydrochloride A solution of 1.8 g. of 3,4,5,6-tetrahydro-6-methyl-6-phenyl-2H-1,3-oxazine in 250 ml. of ethyl acetate was converted to the hydrochloride with excess hydrogen chloride. Then 1.4 g. of acetophenone and 3.8 g. of paraformaldehyde were added and the mixture boiled in an open flask until the oxazine salt had dissolved. The solution was filtered and concentrated until the product started to crystallize out. The product was recrystallized from acetonitrile and melted at 158–160°.

Example 2.—3-(3,4,5,6-tetrahydro-6-methyl-6-phenyl-2H-1,3-oxazin-3-yl)propiophenone 3 g. of the 3-(6-methyl-6-phenyl-3,4,5,6-tetrahydro-2H-1,3-oxazin-3-yl)propiophenone hydrochloride was suspended in 20 ml. of water and a dilute solution of sodium carbonate added until the pH of the solution was >10. The oil that separated was extracted with ether and the solution dried over anhydrous potassium carbonate for four hours. Then the ether solution was filtered and the ether distilled off. The residue, 3-(6-methyl-6-phenyl-3,4,5,6-tetrahydro-2H-1,3-oxazin-3-yl)propiophenone, was a clear oil.

Example 3.—3'-nitro-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 3.3 g. of m-nitroacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 156–158°.

Example 4.—4'-nitro-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 3.3 g. of p-nitroacetophenone and 8 g. of paraformaldehyde were added and the mixture boiled in an open flask until the oxazine salt had dissolved. The solution was filtered and concentrated until the product started to crystallize out. The product was recrystallized from methanol and melted at 178–181°.

Example 5.—4'-fluoro-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 2.6 g. of p-fluoroacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 173–175°.

Example 6.—4'-bromo-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 4 g. of p-bromoacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 175–177°.

Example 7.—4'-chloro-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 3.1 g. of p-chloroacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 173–175°.

Example 8.—4'-hydroxy-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 2.7 g. of p-hydroxyacetophenone and 8 g. of paraformaldehyde were added and the mixture boiled in an open flask until the oxazine salt had dissolved. The solution was filtered and concentrated until the product started to crystallize out. The product was recrystallized from alcohol, M.P. 174–176°.

Example 9.—4'-methoxy-3-(3,4,5,6-tetrahydro-6-methyl-6-phenyl-2H-1,3-oxazin-3-yl)propiophenone hydrochloride A solution of 1.8 g. of 3,4,5,6-tetrahydro-6-methyl-6-phenyl-2H-1,3-oxazine in 250 ml. of ethyl acetate was converted to the hydrochloride with excess hydrogen chloride. Then, 1.5 g. of p-methoxyacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 162–163°.

Example 10.—4'-methyl-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 2.7 g. of p-methylacetophenone and 8 g. of paraformaldehyde were added and the mixture boiled in an open flask until the oxazine salt had dissolved. The solution was filtered and concentrated until the product started to crystallize out. The product was recrystallized from alcohol and melted at 195–197°.

Example 11.—4-acetamido-3-(3,4,5,6-tetrahydro-6-methyl-6-phenyl-2H-1,3-oxazin-3-yl)propiophenone hydrochloride A solution of 7.5 g. of 3,4,5,6-tetrahydro-6-methyl-6-phenyl-2H-1,3-oxazine in 400 ml. of ethyl acetate was converted to the hydrochloride with excess hydrogen chloride. Then, 7.5 g. of p-acetamidoacetophenone and 15 g. of paraformaldehyde were added and the mixture boiled in an open flask until the oxazine salt had dissolved. The solution was filtered and concentrated until the product started to crystallize out. The product was recrystallized from methanol and melted at 187–189°.

Example 12.—3',4'-dimethoxy-3-(3,4,5,6-tetrahydro-6-methyl-6-phenyl-2H-1,3-oxazin-3-yl)propiophenone hydrochloride A solution of 3.5 g. of 3,4,5,6-tetrahydro-6-methyl-6-phenyl-2H-1,3-oxazine in 300 ml. of ethyl acetate was converted to the hydrochloride with excess hydrogen chloride. Then, 3.6 g. of 3,4-dimethoxyacetophenone and 8 g. of paraformaldehyde were added and the mixture boiled in an open flask until the oxazine salt had dissolved. The solution was filtered and concentrated until the product started to crystallize out. The product was recrystallized from acetonitrile and melted at 177–178°.

Example 13.—5,6-dihydro-6-methyl-α,6-diphenyl-2H-1,3-oxazine-3(4H)-propanol

One gram of potassium borohydride was added in portions to a solution of 5 g. of 3-(3,4,5,6-tetrahydro-6-methyl-6-phenyl-2H-1,3-oxazin-3-yl)propiophenone hydrochloride (Example 1) in 100 ml. of alcohol. The reaction was worked up in the usual way. The product distilled at 185–190°/.2 mm. After 3 hours stirring at room Example 14.—4′-nitro-3-(3,4,5,6-tetrahydro - 6-phenyl-2H-1,3-oxazin-3-yl)propiophenone hydrochloride A mixture of 2 g. of 3,4,5,6-tetrahydro-6-phenyl-2H-1,3-oxazine hydrochloride, 1.7 g. of p-nitroacetophenone and 4 g. of paraformaldehyde in 250 ml. of ethyl acetate containing excess hydrogen chloride was boiled in an open flask until the oxazine salt had dissolved. The solution was filtered and concentrated until the product started to crystallize out. The product was recrystallized from alcohol and melted at 163–165°.

Example 15.—3-(3,4,5,6-tetrahydro-6 - phenyl-2H - 1,3-oxazin-3-yl)propiophenone hydrochloride A mixture of 3,4,5,6-tetrahydro-6-phenyl-2H-1,3-oxazine hydrochloride, 1.5 g. of acetophenone and 4 g. of paraformaldehyde in 250 ml. of ethyl acetate containing excess hydrogen chloride was boiled in an open flask until the oxazine salt had dissolved. The solution was filtered and concentrated until the product started to crystallize out. The product was recrystallized from ethyl acetate and melted at 154–155°.

Example 16.—3-(3-hydroxy-3 - phenylbutylamino)propiophenone hydrochloride

A solution of 17.25 g. of 3-(3,4,5,6-tetrahydro-6-methyl-6-phenyl-2H-1,3 - oxazin-3-yl)propiophenone hydrochloride in 100 ml. of i-butyl alcohol containing .9 g. of water, was refluxed for 4 hours. The solution was then cooled in ice water and the product filtered off. The product melted at 172–175°. After recrystallization from acetonitrile, the product melted at 173–175°.

Example 17.—3-(3-hydroxy-3 - phenylbutylmethylamino)propiophenone hydrochloride

A solution of 25 g. of the methobromide of 3-(3,4,5,6-tetrahydro-6-methyl-6-phenyl - 2H-1,3-oxazin - 3-yl)propiophenone in 100 ml. of i-butyl alcohol, containing 1.2 ml. of water, was refluxed for 3 hours. The solvent was distilled off in vacuo and dilute sodium hydroxide added to the residue. The oil was extracted with chloroform and the solvent distilled off. The residue was dissolved in ethyl acetate and the hydrochloride salt precipitated in the usual way by the addition of hydrogen chloride in ethyl acetate. The product was recrystallized from acetonitrile and melted at 135–137°.

Example 18.—α,α′-Iminodiethylene-α-methyldi[benzyl alcohol]oxalate

A solution of 4.5 g. of base derived from 3-(3-hydroxy-3-phenylbutylamino)propiophenone hydrochloride in 150 ml. of methanol, to which was added ½ teaspoon, i.e., about 3 grams, of Raney nickel was hydrogenated at a starting pressure of 50 lbs. at room temperature. After 1 hour, the solution was filtered and the methanol distilled off. The residue was distilled at around 200°/.06 mm. (3 g.). The oxalate salt was formed in the usual way by the addition of a solution of oxalic acid in ether to an ether solution of the distilled product and after recrystallization from ethyl acetate, melted at 89–91°.

Example 19.—3-(3-hydroxy-3-phenylbutylamino)-3′,4′-dimethoxypropiophenone hydrochloride A solution of 8 g. of 3′,4′-dimethoxy-3-(3,4,5,6-tetrahydro-6-methyl-6 - phenyl-2H-1,3 - oxazin-3-yl)propiophenone hydrochloride in 100 ml. of i-butyl alcohol, containing .36 ml. of water, was refluxed for 3 hours. The solvent was distilled off and the residue crystallized from acetonitrile. The product melted at 149–151°.

Example 20.—Bis(3-hydroxy - 3 - phenylbutyl)amine maleate

The Grignard reagent methyl magnesium iodide was prepared from 5.7 g. of methyl iodide and .97 g. of magnesium in 100 ml. of ether. Then, 3.4 g. of 3-(3-hydroxy-3-phenylbutylamino)propiophenone hydrochloride was added in portions and after stirring for 2 hours, the mixture was treated with a saturated solution of ammonium chloride. The ether was separated and dried over potassium carbonate. The ether was distilled off and the residue distilled in vacuo. The product distilled at 180–185°/.06 mm. This distillate was converted to the maleate salt which, after crystallization from ethyl acetate, melted at 133–135°.

Example 21.—3-(3,4,5,6 - tetrahydro-6,6 - diphenyl-2H-1,3-oxazin-3-yl)propiophenone hydrochloride 3-benzylaminopropiophenone hydrochloride (27.5 g.) was added in portions to a Grignard solution prepared from 72 g. of bromobenzene and 11 g. of magnesium in 1 liter of ether. The reaction was worked up as in the preceding example to yield α-phenyl-α-(2-benzylaminoethyl)benzyl alcohol which, after crystallization from ethyl acetate, melted at 147–148°. Debenzylation in the usual manner with palladium carbon yielded the α-phenyl-α-(2-aminoethyl)-benzyl alcohol which, after crystallization from ethyl acetate, melted at 139–141°.

A solution of 7.5 g. of the α-phenyl-α-(2-aminoethyl) benzyl alcohol in 25 ml. of methanol was added to a solution of 6 g. of 37 percent formaldehyde in 20 ml. of methanol and the solution held at room temperature overnight. Then the solvent was distilled off and the residue dissolved in ethyl acetate. Addition of hydrogen chloride precipitated the 3,4,5,6-tetrahydro-6,6-diphenyl-2H-1,3-oxazine hydrochloride, M.P. 173–175°, after crystallization from acetonitrile.

The oxazine hydrochloride (7.1 g.) was added to a mixture of 3 g. of acetophenone and 6 g. of paraformaldehyde in 250 ml. of ethyl acetate containing some hydrogen chloride. The mixture was boiled in an open flask until the oxazine salt had dissolved. The solution was filtered and concentrated until the product, 3-(3,4,5,6-tetrahydro-6,6-diphenyl - 2H-1,3-oxazin-3-yl)propiophenone hydrochloride started to crystallize out. The product was filtered and melted at 171–172°.

Example 22.—3′-methyl - 3-(3,4,5,6-tetrahydro-6-methyl-6-phenyl - 2H - 1,3-oxazin-3-yl)propiophenone hydrochloride To a suspension of 4.3 g. of 3,4,5,6-tetrahydro-6-methyl-6-phenyl-2H-1,3-oxazine hydrochloride in 300 ml. of ethyl acetate containing excess hydrogen chloride was added 2.7 g. of 3′-methylacetophenone and 6 g. of paraformaldehyde. The mixture was boiled in an open flask until the oxazine salt had dissolved, then the solution was filtered and concentrated until the product started to crystallize out. The product was recrystallized from acetonitrile and melted at 171–173°.

Example 23.—2′-methyl - 3-(3,4,5,6-tetrahydro-6-methyl-6-phenyl - 2H-1,3-oxazin - 3-yl)propiophenone hydrochloride To a suspension of 4.3 g. of 3,4,5,6-tetrahydro-6-methyl-6-phenyl-2H-1,3-oxazine hydrochloride in 300 ml. of ethyl acetate containing excess hydrogen chloride was added 2.7 g. of 2′-methylacetophenone and 6 g. of paraformaldehyde. The mixture was boiled in an open flask until the oxazine salt had dissolved. Then the solution was filtered and concentrated until the product started to crystallize out. The product was recrystallized from acetonitrile and melted at 159–161°.

Example 24.—3'-chloro - 3-(3,4,5,6-tetrahydro-6-methyl-6-phenyl - 2H-1,3-oxazin - 3-yl)propriophenone hydrochloride To a suspension of 4.3 g. of 3,4,5,6-tetrahydro-6-methyl-6-phenyl - 2H-1,3-oxazine hydrochloride in 300 ml. of ethyl acetate containing excess hydrogen chloride was added 3.1 g. of 3'-chloroacetophenone and 6 g. of paraformaldehyde. The mixture was boiled in an open flask until the oxazine salt had dissolved, then the solution was filtered and concentrated until the product started to crystallize out. The product was recrystallized from acetonitrile and melted at 164–166°.

Example 25.—2'-chloro - 3-(3,4,5,6-tetrahydro-6-methyl-6-phenyl - 2H-1,3-oxazin - 3-yl)propiophenone hydrochloride To a suspension of 4.3 g. of 3,4,5,6-tetrahydro-6-methyl-6-phenyl - 2H-1,3-oxazine hydrochloride in 300 ml. of ethyl acetate containing excess hydrogen chloride was added 3.1 g. of 2'-chloroacetophenone and 6 g. of paraformaldehyde. The mixture was boiled in an open flask until the oxazine salt had dissolved, then the solution was filtered and concentrated until the product started to crystallize out. The product was recrystallized from acetonitrile and melted at 144–146°.

Example 26.—3',4'-dimethyl - 3-(3,4,5,6-tetrahydro - 6-methyl - 6-phenyl - 2H - 1,3-oxazin - 3-yl)propiophenone hydrochloride To a suspension of 4.3 g. of 3,4,5,6-tetrahydro-6-methyl-6-phenyl - 2H-1,3-oxazine hydrochloride in 300 ml. of ethyl acetate containing excess hydrogen chloride was added 3.1 g. of 3',4'-dimethylacetophenone and 6 g. of paraformaldehyde. The mixture was boiled in an open flask until the oxazine salt had dissolved. Then the solution was filtered and concentrated until the product started to crystallize out. The product was recrystallized from ethanol and melted at 177–179°.

Example 27.—2',4'-dichloro - 3-(3,4,5,6-tetrahydro - 6-methyl - 6-phenyl - 2H-1,3-oxazin - 3-yl)propiophenone hydrochloride To a suspension of 4.3 g. of 3,4,5,6-tetrahydro - 6-methyl - 6-phenyl - 2H-1,3-oxazine hydrochloride in 300 ml. of ethyl acetate containing excess hydrogen chloride was added 3.8 g. of 2',4'-dichloroacetophenone and 6 g. of paraformaldehyde. The mixture was boiled in an open flask until the oxazine salt had dissolved. Then the solution was filtered and concentrated until the product started to crystallize out. The product was recrystallized from acetonitrile and melted at 165–167°.

We claim:

1. A compound of the formula

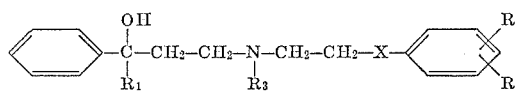

wherein the symbol R in each instance represents a member independently selected from the group consisting of hydrogen, halogen, lower alkyl, lower alkoxy, hydroxyl, and nitro; X is selected from the group consisting of

and

$R_1$ is lower alkyl; and $R_2$ and $R_3$ are selected from the group consisting of hydrogen and lower alkyl and pharmaceutically acceptable acid addition salts thereof.

2. A compound according to claim 1 of the formula

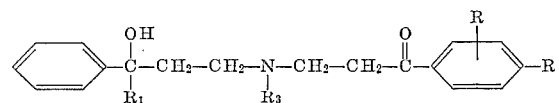

wherein R, $R_1$ and $R_3$ are as in claim 1 and pharmaceutically acceptable acid addition salts thereof.

3. The compound of claim 2 which is 3-(3-hydroxy-3-phenyl-butylmethylamino) propionphenone.

References Cited

UNITED STATES PATENTS

| 1,911,332 | 5/1933  | Warnat       | 260—570.6 |
| 2,774,790 | 12/1956 | Hartough et al. | 260—570.6 |
| 3,197,507 | 7/1965  | Freed et al. | 260—570.5 |
| 3,225,095 | 12/1965 | Thiele       | 260—570.5 |

OTHER REFERENCES

Tsatsos: "Chemical Abstracts," vol. 49, pp. 8856–57 (1955).

Wiley: "Heterocyclic Compounds," Five and Six Membered Compounds With Nitrogen and Oxygen, pp. 344–48 (1962).

ROBERT V. HINES, Primary Examiner

U.S. Cl. X.R.

260—244, 343.7, 501.18, 562, 570.6; 424—330